May 16, 1961 J. R. SOLUM ET AL 2,983,982
FRICTION CLAMP COLLAR
Filed May 5, 1958 2 Sheets-Sheet 2

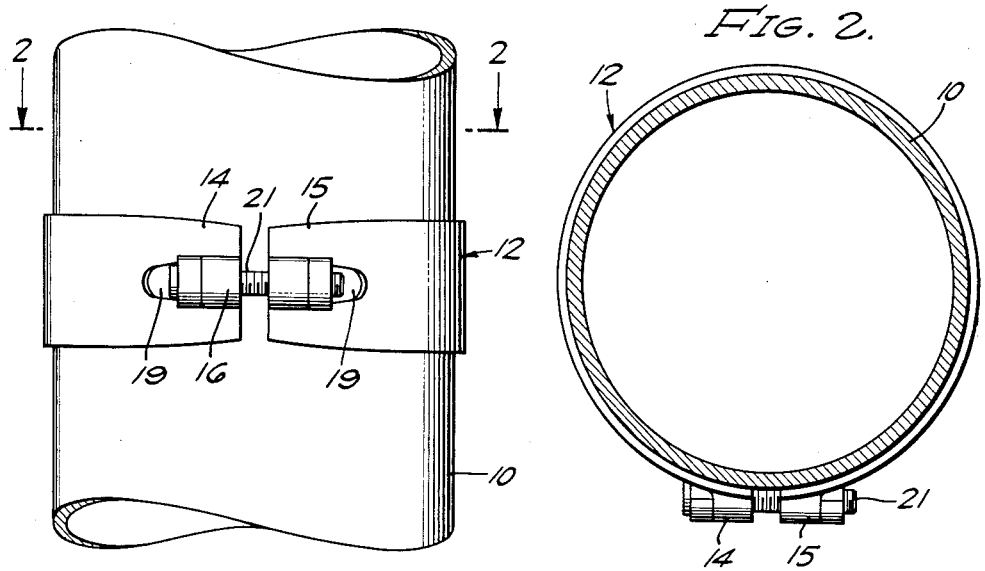
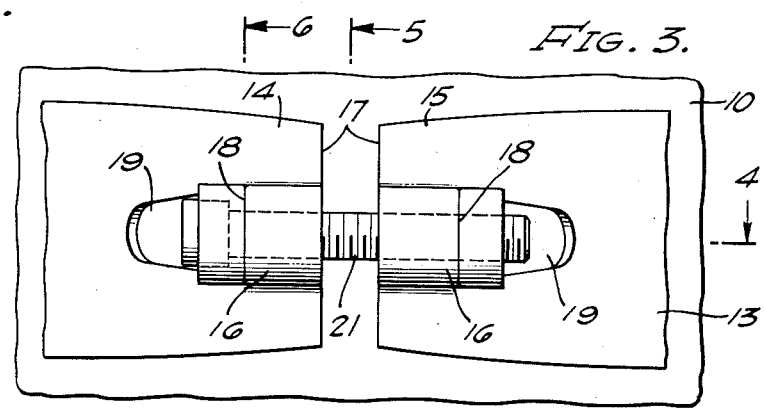
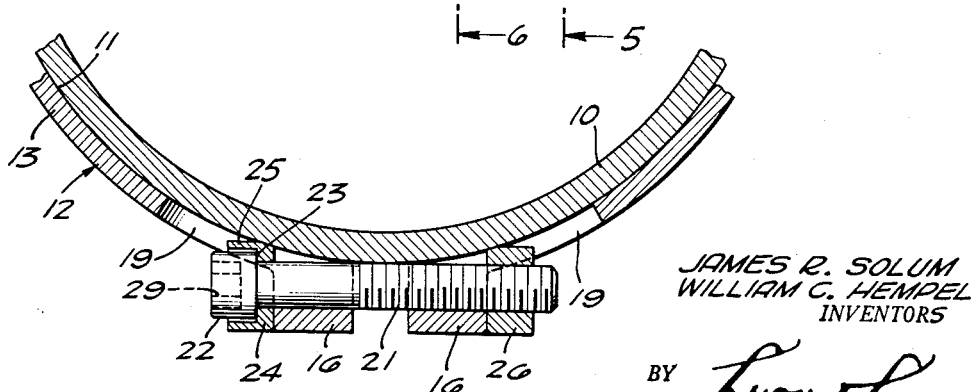

JAMES R. SOLUM
WILLIAM C. HEMPEL
INVENTORS

BY Lyon & Lyon
ATTORNEYS

United States Patent Office 2,983,982
Patented May 16, 1961

2,983,982
FRICTION CLAMP COLLAR

James R. Solum, Los Angeles, and William C. Hempel, Manhattan Beach, Calif., assignors to B and W, Inc., Torrance, Calif., a corporation of California Filed May 5, 1958, Ser. No. 733,088

3 Claims. (Cl. 24—279)

This invention relates to clamp collars and is particularly directed to improvements in a friction clamp collar for use on the outer surface of a pipe to form an abutment. Well pipe of the type known as casing is commonly provided with scratchers or centralizers or other devices mounted on the exterior thereof and used in cementing or other well drilling or completion practices. Stop collars or clamp collars are commonly mounted on the outer surface of the casing to provide an abutment limiting travel of such scratchers or centralizers or other devices. In many cases, it is not feasible to weld stop collars to the casing because of the undesirable stresses set up in the metal of the casing by the welding operation, sometimes leading to formation of cracks.

It is the principal object of this invention to provide a novel form of friction clamp or collar which may readily be mounted on the casing or other pipe, which does not require welding, and when installed provides exceptionally high resistance to forces tending to move it longitudinally along the pipe.

Another object is to provide a friction clamp collar having minimum lateral projections beyond the thickness of the metal of the collar and having a novel form of end terminals for cooperation with a clamping bolt assembly. Another object is to provide a device for this type particularly adapted for economical manufacture on a quantity basis. Another object is to provide a device of this type which will function satisfactorily even beyond the full range of the mill tolerances on outside diameter of the pipe. Other and related objects and advantages will appear hereinafter.

In the drawings:

Figure 1 is a side elevation showing a preferred form of our invention.

Figure 2 is a sectional plan view taken substantially on the lines 2—2 as shown in Figure 1.

Figure 3 is a front view of a portion of the device, shown on an enlarged scale.

Figure 4 is a sectional detail taken substantially on the lines 4—4 as shown in Figure 3.

Figure 5:
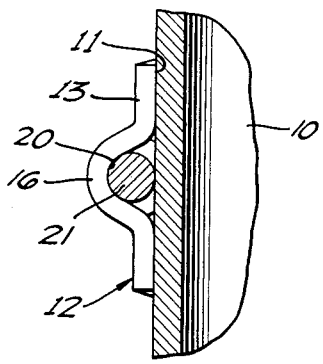
Figure 5 is a sectional detail taken substantially on the lines 5—5 as shown in Figure 3.
Figure 6:
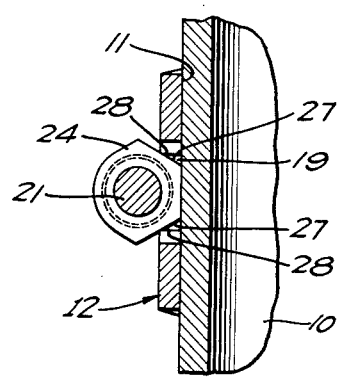
Figure 6 is a view similar to Figure 5 taken substantially on the lines 6—6 as viewed in Figure 3.

Referring to the drawings, the casing or pipe generally designated 10 has an outer cylindrical surface which is contacted by the inner cylindrical surface 11 of the friction clamp collar assembly generally designated 12. This assembly includes a generally cylindrical metal band 13 having juxtaposed end terminals 14 and 15. Each of these terminals includes a curved rib 16 formed integrally with the metal of the band and projecting radially outwardly. The ribs 16 each extend to the extreme free end 17 of the end terminals 14 and 15. A curved abutment 18 is thus formed on one edge of each of the ribs 16. These abutments 18 are located on the distal sides of the ribs 16 and each abutment forms a continuation of a wall defining one of the apertures 19. These apertures 19 extend radially through the end terminals 14 and 15 and extend circumferentially of the band 13.

Each curved rib 16 forms a pocket 20 on its undersurface. This pocket 20 is shaped to receive a clamping bolt 21 which extends between the end terminals 14 and 15. Portions of the bolt 21 extend through the aperture 19. The bolt 21 has a head 22 providing a shoulder 23, and a sleeve-like washer 24 encircles a portion of the bolt and contacts the shoulder 23. The washer 24 is counterbored for loose reception of the bolt head 22 and the skirt 25 which encircles the bolt head stiffens the washer against deflection. This washer 24 is larger in diameter than the width of its aperture 19.

A nut 26 is threaded on the end of the bolt 21 opposite the head 22 and this nut is larger than the width of its aperture 19. The washer 24 and nut 26 may each be conveniently formed from a standard hexagonal nut. The hexagonal faces 27 on the collar 24 and nut 26 engage walls 28 which define the side boundaries of the aperture 19, and thus prevent rotation of the parts 24 and 26 with respect to the band 13.

The central portion of the bolt 21 lies substantially tangent to the inner cylindrical surface of the band 13 and is adapted to contact the outer surfaces of the casing 10. This is an important feature since it minimizes bending deflection of the bolt under the eccentric loading applied by the curved abutments 16. Moreover, the bolt 21 is thus located in the position which produces the minimum amount of radial protrusion beyond the outer surface of the casing 10. The head of the bolt is provided with an internal polygonal recess 29 for reception of a conventional Allen wrench (not shown). The nut and the washer both contact the outer surface of the pipe when the bolt is turned to clamp the band in place.

Figure 7:
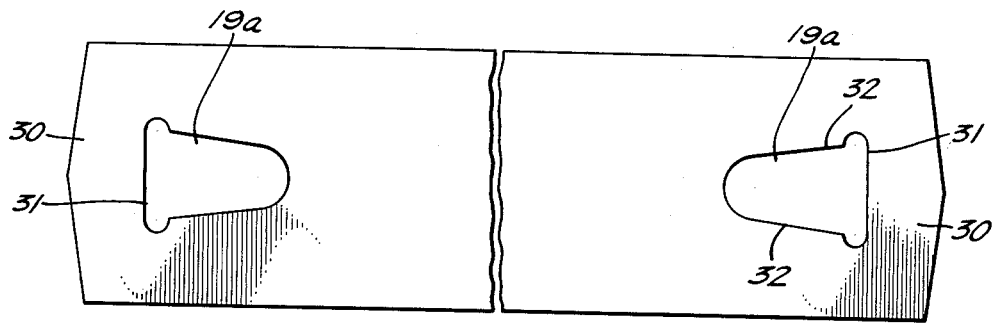
Figure 7 is a view partly broken away showing the blank from which the band or collar is formed.

The band 13 is formed from the blank shown in Figure 7. This blank comprises a metal strip having apertures 19a formed near the opposite ends thereof. These apertures preferably are produced by a stamping operation. The blank may be formed of a low carbon steel, for example, hot rolled S.A.E. 1018, and after the apertures 19a are formed the blank may be subjected to a full anneal. The blank is rolled into generally cylindrical shape and then subjected to a forming operation in suitable dies to produce the curved outwardly projecting ribs 16 from the flat end portions 30. These end portions 30 are located between the apertures 19 and the extreme ends of the blank. The shape of the apertures 19a is chosen to facilitate the die-forming of the abutment surfaces 18. The wall 31 is shaped so that after the die forming operation is complete, the resulting abutment surfaces 18 extend in a generally radial direction. The apertures 19 are wider adjacent the wall 13 than between the walls 32 in order that the abutment surfaces 18 on the completed ribs 16 extend to a position substantially flush with the outer surface of the band 13, and to avoid the formation of a fillet which would interfere with seating of the washer 24 and nut 26 on the abutment surfaces 18.

It will be observed that the end terminals 14 and 15 of the band 13 are somewhat narrower, measured in a direction lengthwise of the pipe, than the remainder of the band 13. This narrowing adjacent the end terminals is a result of displacement of the metal from the flat portions 30 of the blank to form the curved ribs 16 of the completed part.

The inner surface of the band is preferably coated with a galling compound such as for example, anodic micronized mica. This material may conveniently be carried in the paint which is applied over the entire surface of the band as protection against corrosion.

In a typical commercial form of the device having a band 5½ inches in diameter and approximately 3/16 of an inch thick, and tightened on a casing 5½ inches nominal diameter, an axial load of approximately 15,000 pounds is required to cause the device to slide along the pipe surface. Moreover, the required load to cause movement does not decrease after the device has been moved for a considerable distance on the pipe. An examination of the internal surface of the band after tests shows that contact is achieved and maintained over substantially the full area of the internal surface of the band.

Figure 8:
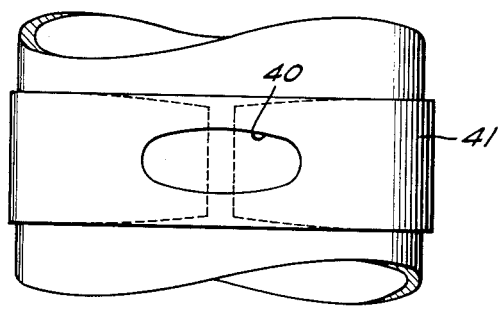
Figure 8 shows a modified form of the device.

In the modified form of our invention shown in Figure 8, there is provided an aperture or opening 40 in the band 41 positioned diametrically opposite the clamping bolt. This opening does not materially reduce the efficiency of the device as a stop collar nor reduce the load required to move it endwise on the pipe, but the opening 40 does make it easier to spring open the band to an extent sufficient to pass over integral enlargements on certain forms of pipe or casing. Such integral enlargements are commonly employed with casing having integral couplings at the ends.

Figure 9:
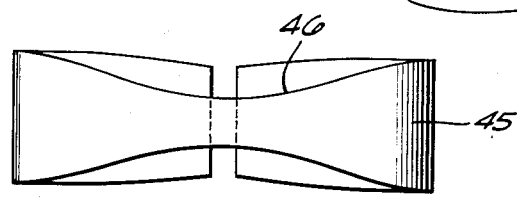
Figure 9 shows a further modification.

In the modified form of the invention shown in Figure 9, the width of the band 45 is narrowed as shown at 46 in the vicinity diametrically opposite the position of the clamping bolt. The reduction in area achieved by this narrowing does not diminish the effectiveness of the device as a stop collar, but does make it easier to spring it open to pass over integral enlargements on the casing or pipe, as described above.

Having fully described our invention, it is to be understood that we do not wish to be limited to the details herein set forth, but our application is of the full scope of the appended claims.

We claim:

1. In a friction clamp collar for a well pipe, a metal clamping band adapted to contact the outer cylindrical surface of the pipe, the band having juxtaposed end terminals each provided with a U-shaped central rib projecting radially outwardly and extending to the extreme free end of the terminal, each rib being formed integrally with the metal of the band and being curved to define a pocket open toward the surface of said pipe, the band having an aperture adjacent each rib, each rib having an end surface adjacent an aperture and defining a curved abutment, a clamp bolt assembly received in said pockets and extending through the apertures, spaced shoulder means on the bolt assembly engaging said curved abutments, said bolt assembly having a portion substantially tangent to the inner cylindrical surface of the band and adapted to be contacted by the outer surface of the pipe.

2. In a friction clamp collar for a well pipe, a clamping band adapted to contact the outer cylindrical surface of the pipe, the band having juxtaposed end terminals each provided with an arched rib projecting radially outwardly and extending to the extreme end of the terminal, each rib being formed integrally with the material of the band and being shaped to define a pocket opening toward the interior of the band, the band having a circumferentially extending aperture adjacent each rib, each rib having an end surface adjacent one of the apertures, respectively, and defining an abutment, a clamp bolt assembly received in said pockets and extending through said apertures, said clamp bolt assembly including a threaded bolt having a head, a washer adjacent the head, and a nut remote from the washer, said washer and said nut engaging said abutments, said washer and said nut having greater lateral dimensions than said apertures, and said bolt having a central portion substantially tangent to the inner cylindrical surface of the band in position to be contacted by the outer cylindrical surface of the pipe.

3. A clamp, comprising: a metal band adapted to encircle a cylindrical member and having confronting juxtaposed end terminals, said band having an aperture near each end terminal, there being a transverse rib extending from each aperture to the extreme end of the terminal, said transverse ribs being arched to form pockets open toward said cylindrical member and communicating between said apertures; and a tension bolt assembly retained in said pockets and having nut and washer elements bearing against the distal ends of said ribs, said elements having sides extending through said apertures and adapted for bearing contact with said cylindrical member.

References Cited in the file of this patent

UNITED STATES PATENTS

| | | |
|---|---|---|
| 492,855 | Weidaw | Mar. 7, 1893 |
| 1,882,305 | Stupar | Oct. 11, 1932 |
| 2,458,007 | Knapp | Jan. 4, 1949 |
| 2,836,447 | Wright | May 27, 1958 |